United States Patent Office.

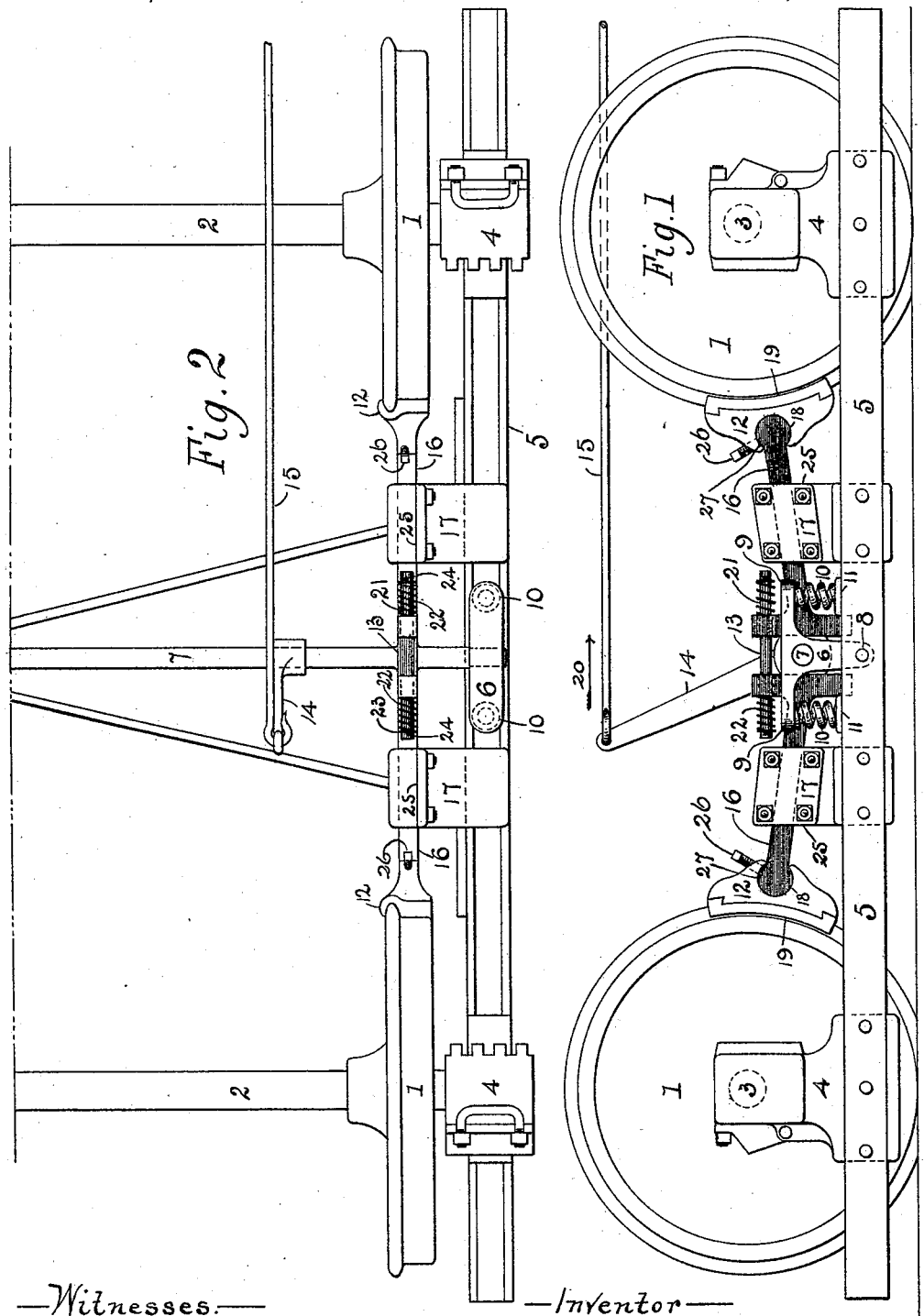

LOUIS T. PYOTT, OF PHILADELPHIA, PENNSYLVANIA, ASSIGNOR OF ONE-HALF TO AUSTEN W. GOODELL AND DANIEL A. WATERS, OF SAME PLACE.

CAR-BRAKE.

SPECIFICATION forming part of Letters Patent No. 549,857, dated November 12, 1895.

Application filed May 31, 1895. Serial No. 551,045. (No model.)

*To all whom it may concern:*

Be it known that I, LOUIS T. PYOTT, a citizen of the United States, residing at Philadelphia, in the county of Philadelphia and State of Pennsylvania, have invented certain new and useful Improvements in Railway-Car Brakes; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in the application of brake mechanism to the wheels of railway-cars, and more especially to street-railway cars which are propelled by a motor or motors attached thereto; but I do not limit myself to such application, as my invention is equally adapted to other forms of street-railway cars and to various forms of steam-railway cars and rolling equipment.

The object of my invention is to make a brake of few parts, the parts of simple and inexpensive construction, and which shall be cheap in the first cost, cheap to renew, and at the same time be very efficient for the purpose intended.

I place my brake between the wheels so as to not oppose the ready removal of the wheels from the truck when required, the brake, as shown and described, being applied to the truck patented to me and having my side-opening axle-boxes, whereby by loosening the side cover of the axle-box the wheels and axle are readily rolled out or into their place in the axle-boxes of the truck. I introduce into my construction means of ready adjustment of the shoes to the wheels, so as to at all times have equal contact and pressure of all the shoes upon all the wheels and each shoe to bear equally throughout its contact-surface. I attain these objects by the mechanism illustrated in the accompanying drawings, in which—

Figure 1 is a side elevation of the truck. Fig. 2 is a plan view of one half of the truck.

Similar characters refer to similar parts in each figure.

The wheels 1 are upon axles 2, as is usual in all forms of trucks, the axle ends having journals 3 resting in axle-boxes 4, secured to a framing 5 below them, and midway between the axle-boxes 4 on the frame 5 I attach rocking end bearings 6, which support and carry the brake-shaft 7, which extends transversely across the truck. The rocking end bearings 6 are pivoted to the frame 5 at 8 and reach upward to and embrace the brake-shaft 7. They also have upon each side longitudinally of the truck projecting extensions 9, which reach forward and back above the truck-frame 5, and thus provide two spaces, into each of which I introduce springs 10, the springs 10 being seated at their lower ends upon the seats 11, secured immovably upon the frame 5, and their upper ends pressing against the extensions 9 of the bearings 6. The drawings show spiral springs; but rubber springs, volute springs, or any form of springs which will answer the purpose may be employed. These springs maintain the rocking end bearings 6 in their normal central position when the brake is at rest, but permit a side movement when the brake is applied, if it is necessary to equalize the pressure upon the brake-shoes 12 when forced against the wheels 1 on account of one shoe 12 coming into contact with the wheel before the other one does. The brake-shaft 7 is provided with two double cams 13, they being in line with the set of brake-shoes 12, provided for the pair of wheels 1 on each side of the truck. The cams 13 may either be made integral with the shaft 7 or separately attached. The shaft 7 is also provided with a brake-lever 14, securely attached to it, from which a rod or chain 15 passes to and is connected with the means by which the brake is applied, it being adapted to be operated by such means, whether it be hand-power or otherwise.

The double cams 13 when the brake is off, or at rest, extend above and below the shaft 7. In line longitudinally with the double cams 13 are placed the push-bars 16, their inner ends being preferably formed T-shaped or in an equivalent manner to present sufficient surface to receive the action of the double cams 13. The push-bars extend from the shaft 7 toward the wheels 1 in an angular and upwardly-tending direction, the line being radial from the center of the wheels 1 to the shaft 7, and each are carried by and move in a bracket 17, attached to the frame 5, and at their outer end are secured to the brake-shoes 12, the outer end of the push-bars 16 being circular shaped to permit of their self-adjustment to the wheels and resting in recesses or pockets 18 similar shaped in the brake-shoes 12. The shoes have set-screws 26 passing into recesses 27 to prevent the heads 12 moving too freely on the push-bars 16 and to secure the heads sidewise, and the heads 12 are provided with liners 19, if deemed preferable, the liners being attached in any of the usual or suitable methods. When the brake-lever 14 is moved in the direction of the arrow 20, the upper and lower ends of the double cam 13 move radially and outwardly against the ends of the push-bars 16, forcing them and their attached brake-shoes 12 against the wheels 1 but if from any inequality of wear or lost motion one shoe reaches its wheel and commences to press before the other one does the rocking end bearings 6 will be forced sidewise away from the pressure by means of the compressing of the opposed spring 10, and so force the opposite shoe to its seat on its wheel and equalize the pressure. Now when the truck and its carrying load have come to a state of rest or it is desired to remove the brake I have provided the following means of accomplishing that result:

Attached to the inner ends of the push-bars 16 on one end, as I have shown, or both ends, if deemed preferable, is a rod or bolt 21, not fitting snugly, but perfectly free, and on each end of this rod or bolt 21, outside of the push-bar head, I mount a spring 22, seated against the head and kept to its seat by a washer 23 and pin 24 or like suitable means. Now when the heads are pushed apart in applying the brake these springs 22 are compressed, and when the power operating the brake is removed and the cams resume their normal position the springs 22 also resume their nominal state, and forcing the heads against the double cams 13 remove the brake-shoes 12 from contact with the wheels 1. This release is also assisted by the push-bars 16 and their attached heads 12 sliding downward by their own gravity on the inclined surfaces formed in the brackets 17, this being one object in constructing the brake so as to have the push-bars work upward in applying the brake, as well as it being deemed good mechanical construction to thrust against the wheels in a radial line, so as to have equal and exact contact of the entire surface of the shoe to the wheel.

The brackets 17 are provided with a cap 25 to enable a ready insertion or removal of the push-bars 16 into their places. The brake-shoes 12 or their liners 19 will preferably embrace the wheel-flange, as is quite usual in good practice, although it is not essential and no part of my invention.

I am aware that the use of cams as a means of applying brakes is not new, as I, as well as others, have heretofore applied them, but in an entirely different manner and different construction. Therefore I make no claim to the use of the double cam as by itself; but I do claim—

1. In a car brake, a side frame for the truck, rocking bearings thereon to carry a brake shaft, side extensions on the bearings, springs for the side extensions and seats to support the springs, substantially as described.

2. In a car brake, side framing for the truck, rocking bearings thereon, springs to maintain its position as specified, a shaft inserted therein extending from one bearing to the other, and double ended cams near each end of the shaft substantially as described.

3. In a car brake, a truck frame having suspended thereto yielding rocking bearings on each side frame, means for maintaining the normal position of the side bearings, a shaft inserted in the bearings reaching from one to the other, a lever attached to the shaft, and means to connect to the source of power, substantially as described.

4. In a brake, a brake shaft secured in rocking bearings at its ends, a lever on the shaft, means for attaching the lever to the source of power, two double cams on the shaft, and push bars abutting and outwardly forced by the cams, substantially as described.

5. In a brake, a transverse shaft yieldingly supported, means for revolving the shaft, cams thereon engaging push bars, brake shoes at the outer ends of the push bars, the brake shoes being automatically adjustable on the push bars, substantially as described.

6. In a car brake, a transverse brake shaft, centrally located between the wheels, yielding supports therefor, cams for forcing the brake, push bars from the cams, articulated brake shoes attached thereto, liners on the brake shoes, and guides attached to the truck frame to carry the push bars from a low point at their shaft or inner end to a more elevated point at their shoe or outer end, substantially as described.

7. A car brake having a centrally carried transverse shaft yieldingly suspended, cams on the shaft, abutting mechanism on each side of the cams, the abutting parts being yieldingly held to the cams, so that when the brake is released the yielding mechanism returns them to the cam, brake shoes attached concentric to the ends of the abutting mechanism, guides to carry the abutting mechanism and its shoes in a line radial to the center of the wheel operated upon, means for removing the abutting mechanism from its guide, a brake lever on the brake shaft, and means to connect it to the source of power, substantially as described.

8. In a brake, a central transverse shaft located below the line of brake shoes, double cams thereon, a push bar to engage one side of each cam, a self adjusting brake shoe attached to the outer end of the push bar, ascending guides for the push bars, caps on the guides, a rod attached to the head of the push bars, springs thereon outside the heads, means for securing the springs in compression, to force the heads to the cams; and connecting mechanism from the cams to the power provided on the car for applying the brake, substantially as described.

9. In a car brake, a truck frame carrying yielding supports for a transverse shaft, cams on the shaft, push bars in contact with the cams, yielding mechanism holding the bars against the cams, angular guides for the bars, caps on the guides to permit placing and displacing of the bars, shoes on the bars, the shoes yieldingly held to the bars for self adjustment, means for controlling the freedom of adjustment and side security, and connections for the brake mechanism on the truck to the power on the car, substantially as described.

In testimony whereof I affix my signature in presence of two witnesses.

LOUIS T. PYOTT.

Witnesses:
GEO. W. REED,
R. C. WRIGHT.